Jan. 13, 1959 H. DOELEMAN ET AL 2,869,115
DIRECT CURRENT TO DIGITAL CODING AND DECODING SYSTEM
Filed March 23, 1953 2 Sheets-Sheet 1

Henry Doeleman.
Robert B. Bonney.
INVENTORS

BY D. C. Snyder
A R McCrady
ATTORNEYS.

DIRECT CURRENT TO DIGITAL CODING AND DECODING SYSTEM

Filed March 23, 1953 2 Sheets-Sheet 2

Henry Doeleman
Robert B. Bonney
INVENTORS.

BY D. G. Angier
A R McCready
ATTORNEYS.

United States Patent Office 2,869,115

Patented Jan. 13, 1959

2,869,115

DIRECT CURRENT TO DIGITAL CODING AND DECODING SYSTEM

Henry Doeleman and Robert B. Bonney, Los Angeles, Calif., assignors, by mesne assignments, to the United States of America as represented by the Secretary of the Navy Application March 23, 1953, Serial No. 343,888

2 Claims. (Cl. 340—347)

This invention relates to an analogue to digital coding and decoding system of the type wherein ratio resistance networks and summing amplifiers relate direct current voltages to a binary pulse code and vice versa.

In the use and recording of data, it is important in many instances that information which is in analogue D. C. voltage form be transmitted over a low quality communications system without loss of accuracy. For example, it may be desirable to receive at a central location the information gathered by remotely located radar equipment, or to transmit target position coordinate data from an analogue computer to a distant location for radar positioning, for additional computing, or to data recording equipment. This transmission of information over ordinary radio communication links may be carried out accurately by transforming the D. C. data into a binary pulse coded form, transmitting the pulse code, and finally reconverting the data to analogue form, so that it may be used in other analogue equipment. By using the digital form, the detection of the presence or absence of a pulse is the only requirement at the receiving end, and hence the system is much less affected by noise, amplitude distortion, and pulse distortion than would be an analogue transmission system. Common coding circuits known to the prior art are dependent on the time linearity of a sawtooth wave shape for accuracy or require optical mechanical arrangements for generating a proportional pulse code number by servo positioning a marked code wheel. The known methods are inherently inaccurate and the decoding process is not reliable. In the instant invention, the basic units are the coder which is located at the transmitting terminal, and the decoder which is located at the receiving terminal. In the coder, a stepping type coding circuit is employed in which the D. C. input data is compared to a step voltage generator which changes in voltage steps of predetermined units until the step voltage equals the data voltage within the coding accuracy limits of the code used. The decoding switching and ratio network circuits are similar to those of the coder; the D. C. data output is generated by setting up and summing voltages in the decoder as were used in the coder step voltage generator to match the input data.

The invention also comprises a method of utilizing electrical energy in the manner indicated to convert analogue information to digital information and vice versa.

An object of the invention is to provide an improved method and apparatus for the transmission of information.

Another object of the invention is to provide apparatus for the transmission of data, originally in analogue D. C. voltage form, over a low quality communication system without loss of accuracy.

It is a further object of the invention to provide apparatus for accurately transmitting information to and from remote installations which is relatively free from noise and from distortion introduced by the communications link.

Other objects and many of the attendant advantages of this invention will be readily appreciated as the same becomes better understood by reference to the following description.

Figure 1:
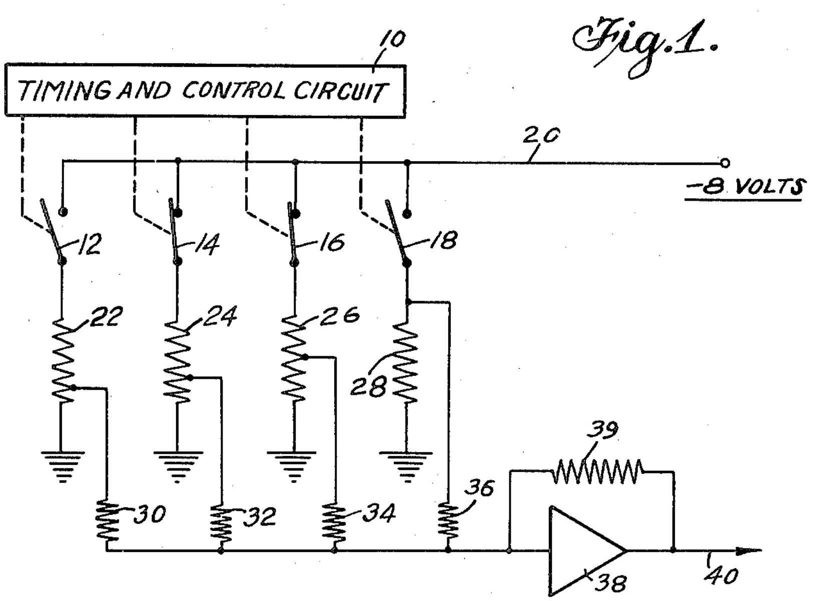
Fig. 1 is a schematic diagram of a basic decoding circuit.

The four-digit decoding arrangement shown in illustrative form in Fig. 1 comprises timing and control circuits 10 and switches 12, 14, 16 and 18. The switching may be carried out by electronic tubes or by mechanical elements as found in conventional relays. An accurately controlled voltage is made available through lead 20 and the four switches to the ratio networks, which includes voltage dividers 22, 24, 26 and 28. For purposes of illustration, it will be assumed that −8 volts D. C. is applied through lead 20; in practice, the voltages employed are generally higher to provide for a sufficient number of voltage steps. The absolute value of the voltage is not important but it must be maintained constant. A summing network including resistors 30, 32, 34 and 36 is positioned between the ratio network and direct coupled amplifier 38, having output lead 40.

In the operation of the above described arrangement, the incoming pulse code, through the operation of well known types of pulse gating circuits, causes the appropriate switches to be closed. The use of input binary signals can be considered as a way of coding decimal numbers such that for each decimal value there can be one, and only one, binary number and such that binary numbers can be represented by only "ones" and "zeros" (i. e., pulses and no pulses). For example, if the binary code is 0110, corresponding to 6 volts in the apparatus shown, switches 12 and 18 will be open and switches 14 and 16 will be closed. Each switch connects minus 8 volts to a resistance ratio network. The ratio of the various networks decreases in the order 1/1, 1/2, 1/4, and 1/8 from right to left to conform to the conventional digital code configuration. With switches 14 and 16 closed, minus two volts will be added to minus four volts in the summing networks. The combined voltage at the juncture of resistors 32 and 34 is proportional to the sum of the voltages applied by the stages in which the switch is closed. The only addition needed to make the decoding complete is some device which will make the output equal rather than proportional to the sum of the voltages from the stages with the switches closed. This is accomplished with direct coupled amplifier 38. This amplifier, which may be any of numerous known types such as disclosed in Fig. 5.33 on page 195 of "Electronic Analog Computers" by Granino A. Korn, published by McGraw-Hill Book Company, Inc., publication date 1951, has 100% feedback, as represented by the resistor 39 and serves for isolation and impedance matching. The output of the amplifier through lead 40 will be the negative of the sum of the voltages supplied by the stages in which the switch is closed. Since these voltages are negative, the output will be positive. It is thus possible to convert the data in the form of a binary coded sequence of pulses coming into the decoder into a voltage equal to the desired value.

Coding is accomplished by using circuits similar to those used in the decoder plus a feedback arrangement. The switches in the various digit stages are made to open or close in such a manner that the sum of the voltages which they turn on is equal, within the accuracy of the system, to the incoming voltage. Then, by examining to see which switches are closed, the binary number can be read out. This causes the counter to hold a binary number which represents the data voltage.

Figure 2:
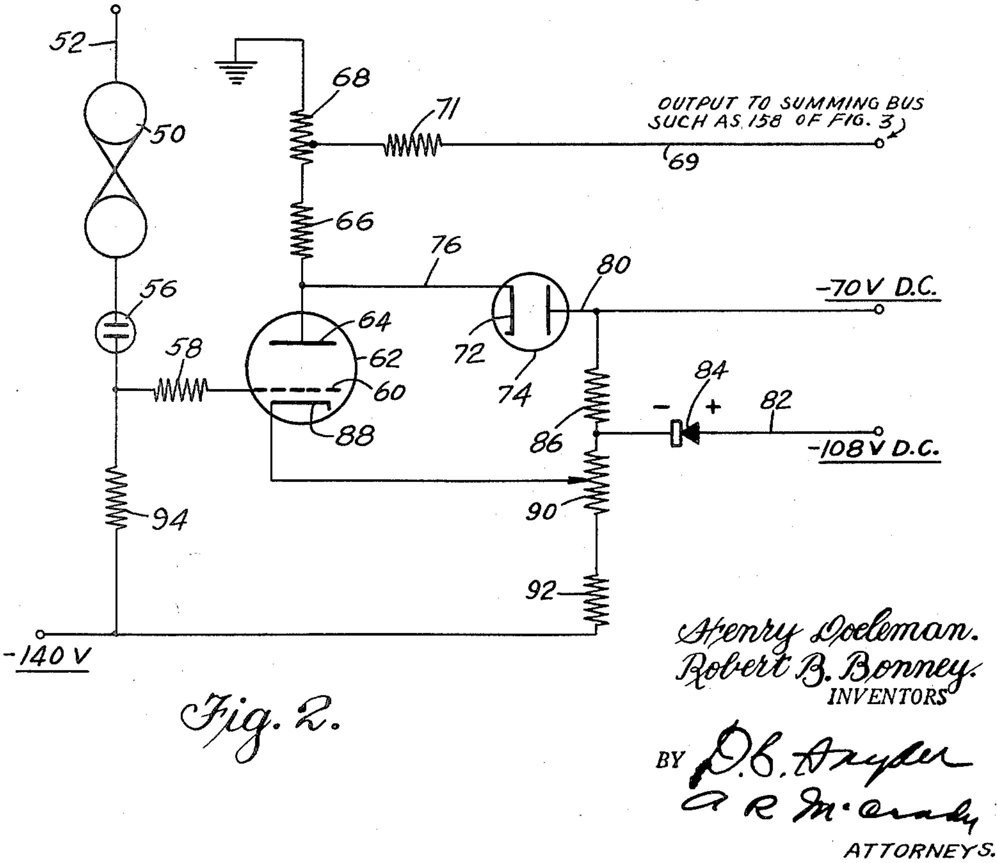
Fig. 2 is a schematic diagram of a switching circuit unit.

A suitable form of electronics switch for connecting various values of resistance into the ratio network is shown in Fig. 2 with typical voltage values indicated. The input signal enters bi-stable multivibrator 50 through lead 52. The signal is derived from the timing circuit described more fully in connection with Fig. 3, and the multivibrator output voltage is applied through neon bulb 56 and grid bias resistor 58 to grid 60 of tube 62 which may conveniently be one section of a 12AT7 twin triode. Plate 64 is connected to cathode 72 of clamping diode 74 by means of lead 76. Compensating resistor 66 is connected to resistor 68 in the plate circuit of tube 74 to form a voltage dividing ratio network which has an output to the summing bus through lead 69. Isolating resistor 71 is positioned in lead 69. The plate of the clamping diode is connected through lead 80 to a well regulated voltage source maintained at −70 volts. Lead 82 contains a rectifier 84 such as a 1N34 diode, for example, having polarity arranged as indicated, and is connected to a minus 108 volt source and to lead 80 through constant load resistor 86. Cathode 88 of tube 62 is connected to −140 volts through potentiometer 90 and fixed resistor 92. Current limiting resistor 94 is interposed between the −140 volt source and the juncture of neon bulb 56 and grid resistor 58.

In the operation of the above described circuit, the voltage applied to the grid of tube 62 will depend upon the state of multivibrator 50. Grid 60 is either driven negative to cutoff or is driven positive (limited by resistor 58). When the tube is at cutoff, plate 64 and consequently the voltage at the connection of resistor 66 and lead 76 will be at zero. However, if multivibrator 50 is on, current will flow in tube 62 and a voltage will be generated across the resistance network including resistor 68. The junction of neon bulb 56 and grid resistor 58 will be at a potential of approximately −75 volts. Hence, tube 62 will be taking grid current through resistor 58, bringing the grid to a point just slightly above the cathode which is returned to a negative voltage. Plate 64 will immediately drop towards −80 volts. As the plate goes down, a point is reached where diode 74 starts taking current. Since the diode current opposes that of the triode, the plate of tube 62 is clamped to the −70 volt bus. As there is a voltage across diode 74 of approximately 0.250 volt, the plate of tube 62 will be at −70.250 volts. Resistor 66 is added to the ratio network to compensate for this voltage drop, thus placing the bottom of resistor 68 precisely at minus 70.0. Since the impedance of tube 74 when conducting is approximately 250 ohms compared to the 100 ohm plate load resistance of tube 62, the plate voltage is accurately clamped to the desired voltage. By regulating the voltages to the cathode heaters, not shown, of the vacuum tubes to provide constant emission, it is possible to maintain calibration of the circuit to within ten to fifteen millivolts of minus 70 volts over long periods of time. Initial calibration of the circuit is accomplished by adjustment of potentiometer 90 which adjusts the current through clamping diodes 74 to produce exactly −70 volts for the ratio network. When multivibrator 50 applies negative bias to tube 62, the tube is cutoff and no plate current flows. In the actual circuit the grid is driven substantially beyond cutoff and the only current flowing is a minute amount of gas current which will result in less than 10 millivolts at the plate of tube 62. In the succeeding similar stages, the tap of resistor 68 to resistor 71 is moved closer to ground so that the −70 volts appearing across resistor 68 is divided by 2, 4, 8, 16 etc. Crystal diode 84 prevents cathode 88 from following the grid to a low negative point and allowing the tube to cut off. The use of the elements shown in the above described circuit permits switching between zero and 70 volts or any other D. C. range with stable calibration and a high degree of accuracy. The switching function itself may be performed by mechanical relays instead of by tube 62. The −70 volt supply may be accurately regulated by any one of many known means. A satisfactory supply is one having a fast acting D. C. regulator and stabilized against slow drifts by means of a chopper amplifier and a standard voltage cell which may be, for example, of the Weston type. The circuitry keeps the output voltage within plus or minus 15 millivolts of −70 volts. By using a power supply regulated against the standard cell, the output of the decoder will be absolutely equal to, not merely of the same amplitude as, the voltage put into the coder.

Figure 3:
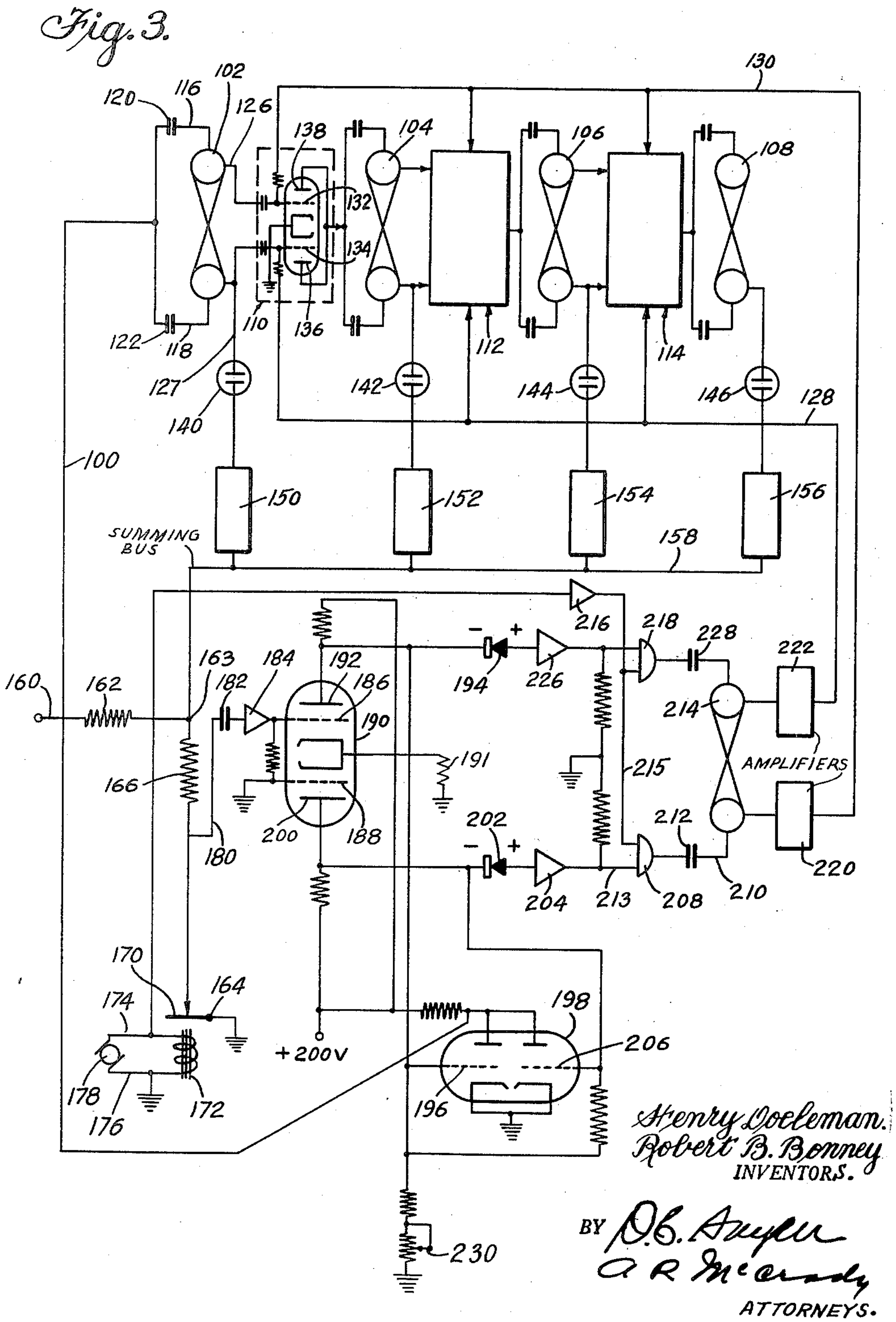
Fig. 3 is a block diagram of a coding circuit.

A code reconverter is shown in illustrative form in Fig. 3. Negative pulses through lead 100 are applied to a reversible binary counter which comprises multivibrators 102, 104, 106 and 108, and binary switches 110, 112 and 114. The pulse input is applied through leads 116 and 118, containing capacitors 120 and 122 respectively, to upper and lower terminals of multivibrator 102. The multivibrators are of the bistable or flip-flop type in which the upper tube conducts while the lower tube does not and vice versa. The plate of the triode of the upper section of the multivibrator is connected to the input circuit of the following multivibrator, and so on. The connections are such that a negative input applied simultaneously to both triodes will cause the multivibrator to change state while positive pulses will not cause the multivibrator to change position. The binary switches or pulse gates represented by blocks 112 and 114 are the same as pulse gate 110, shown schematically, which is adapted to receive and act upon signals from multivibrator 102. Depending upon the voltages on count up bus 128 and count down bus 130, the output of one section only of multivibrator 102 will be connected through leads 126 and 127 and switch 110 to the input of multivibrator 104 when and only when a positive pulse acting in conjunction with a low voltage on the count up or count down bus is applied to one of the two grids 132 and 134 of the tube. The two plates 136 and 138 of the pulse gate are tied together. It will be noted that the pulse gates invert the input pulses so a positive input to the pulse gates 110, 112 and 114 is required to provide the necessary negative input pulse to the following multivibrator. Provisions for heater and plate voltages will be understood and are not shown. The voltages on count up bus 128 and count down bus 130 are also controlled by a multivibrator as hereinafter explained. Assume that count up bus 128 is only slightly negative relative to the cathodes of the vacuum tubes in the gates and that count down bus 130 is very negative so that the lower output lead of each multivibrator is effectively connected to the input lead of the succeeding multivibrator, i. e. a positive pulse from multivibrator 102 to grid 134 will be able to overcome the low bias provided through the count up bus and the tube will fire when a positive pulse is received and in turn send a negative pulse to the next multivibrator stage, while at the same time the upper output lead is effectively open circuited due to the relatively high negative bias on bus 130 and grid 132. The numerical value of the count is indicated by neon lamps 140, 142, 144 and 146, the digit "one" being registered when the lamp is on and the digit "0" being registered when the lamp is off. Thus, if the lamps in stages 1 and 4 are on, a total of nine pulses is being registered. The operation of the counter is explained by further assuming that the count is initially at zero, that is, all neon lamps are off. Upon receipt of the first pulse, the first multivibrator 102 changes to its other stable state, the plate connected to the neon lamp through lead 127, goes negative, and lamp 140 lights indicating 0001=1 unit. A negative pulse is sent to the lower half of pulse gate 110, but since only positive pulses can open the channel through the gate, nothing further happens at the lower half. A positive pulse goes to the upper half of the pulse gate but this also has no effect since the bias on lead 130 is so negative that the positive pulse cannot overcome this voltage. The next input pulse again changes the position of stage number 1, which, as lamp 140 is extinguished, sends a negative pulse through lead 126 and a positive pulse through lead 127 which is now effective to cause multivibrator 104 to change state. Lamp 142 is now lighted and the number 0010 is indicated, which is equal to two units of voltage. The next input pulse will cause lamp 142 to go on and lamp 143 will remain on thus indicating 0011 equal 3 units. The fourth input pulse will extinguish lamp 1 which in turn sends a positive pulse to gate 110 which in turn sends a negative pulse to extinguish lamp 142. Lamp 144 will now light since lamp 142 is extinguished, but no further change occurs since the resulting positive pulse to the upper part of pulse gate 114 has no effect and the counter stands at 0100 or four units. As additional pulses are received, the count increases to a maximum code of 1111 which is equivalent to 15 units. The sixteenth pulse will extinguish all lights and set the counter to zero ready to start over. By reversing the voltages on count up bus 128 and count down bus 130, the counter will count down. For example, if the counter indicates 0011=3, the next pulse will reduce the count to 0010=2. Since the multivibrator 102 changes state no matter what the voltage is on buses 128 and 130, and the positive pulse from the plate in the lower part multivibrator 102 cannot get through pulse gate 110 due to a high bias on bus 128, the following pulse will cause multivibrator 104 to change and extinguish lamp 142. The pulses continue to arrive, the counter will register 1111=15 units after 0 and continue the counting down process. It will be understood that a large number of multivibrators may be used in the manner indicated to generate any desired range of figures. A suitable arrangement includes 9 multivibrators which provides 512 steps.

The switching circuits represented by boxes 150, 152, 154 and 156 are connected through neon lamps 140, 142, 144 and 146 respectively to the lower plates of the binary counter multivibrator stages. These switching circuits are preferably of a type discussed in connection with Fig. 2. The ratio network included in each switching circuit is proportioned so that the circuit associated with the end multivibrator stage on the left side produces one negative unit of voltage; that of the next stage, two negative units of voltage; that of the fourth, four negative units, and so on. The switching circuits are so connected that when the multivibrator stage is on, the associated neon lamp is lit and the appropriate voltage is generated, but if the lamp in any stage is extinguished, the voltage from that stage will be zero. Thus, the count indicates the number of negative voltage units generated. The output of each of the switching circuits is connected through the included resistor to the common summing bus 158; the positive data input voltage is also connected to summing bus 158 by means of lead 160. Resistor 162 is similar to the included resistors in the switching circuits and is positioned in lead 160 so that the data voltage will have the same effect as the summed digit voltages. Lead 160 and summing bus 158 are connected together at point 163. The algebraic sum of the combination of the positive data input voltage with the negative digit voltages on summing bus 158 is taken to ground at point 164 through resistor 166 and the contact points of chopper 170. The energizing current for chopper armature 172 is provided through leads 174 and 176 from the A. C. source 178. The frequency of the chopper action may conveniently be of the order of 360 cycles per second. While the presence of resistor 166 is in many cases desirable in order to limit the amount of current which the contacts of chopper 170 can draw under transient conditions, this resistor has no appreciable effect on the operation of the circuit when the coder is balanced or near balance. Hence it may be omitted if desired.

Chopper 170 clamps the error voltage, which is the difference between the data input and summed digit voltages to ground 360 times per second. If the error voltage is positive, that is, if the data input voltage is more positive than the digit voltage is negative, a negative and a positive pulse will appear on lead 180 as chopper contacts close and open respectively, so that the chopper action results in a sampling of the error signal. This is made possible through the relationship between the data input resistor 162 and the incremental summing resistors (such as 71 in Fig. 2) which are incorporated in the switching circuits 150—156. When the system is balanced, the sum of the negative voltages applied to such incremental summing resistors will equal the positive data voltage applied to resistor 162, and the summing point 163 will be at zero potential. If the input voltage decreases, a negative error signal will appear. This error signal is then "sampled" by the chopper 170, as above brought out, to produce pulses of alternating polarity on lead 180. The alternating polarity of the pulses makes it possible to amplify them, after passing through coupling capacitor 182, in amplifier 184. The output of amplifier 184 is applied to grids 186 and 188 of tube 190, which is arranged in conventional manner as a phase splitter, and is provided with a cathode resistor 191. A positive pulse at plate 192 of tube 190 will be applied to the cathode of crystal diode 194 where it is dissipated across diode back resistance. This same positive pulse is also applied to grid 196 of tube 198 where, if of sufficient amplitude, to overcome the negative bias maintained on grid 196, it is again inverted thus sending a negative pulse through lead 100 to the binary counter. The negative pulse at plate 200 of tube 190 passes through crystal diode 202 and drives amplifier 204 which is a pulse amplifier of conventional design and adapted to provide a standard negative pulse. The negative pulse at plate 200 is also applied to grid 206 of tube 198 but since the triode containing grid 206 is already biased to cutoff, nothing further happens here. The negative pulse from amplifier 204 goes to a coincidence circuit 208, which is of conventional design and consequently is shown in block form. The coincidence circuit is effective to produce an output on lead 210 through capacitor 212 to the lower end of multivibrator 214 when and only when simultaneous signals on leads 213 and 215 are fed into coincidence circuit 208. The signal on lead 215 is derived from the chopper driver circuit through shaping circuit 216 which is effective to convert the sine wave from source 178 into square wave gating pulses. The coincidence circuit thus allows only the pulse generated when the chopper closes to pass. The 360 C. P. S. square wave applied to coincidence circuit 208 and 218 is phased in such manner that the pulse generated when the chopper closes is passed, and the pulse generated when the chopper opens is blocked. The output of multivibrator 214 goes to amplifiers 220 and 222. These amplifiers which may take any of various known forms, are adapted to shift the voltage level of the input signals to the desired values and to provide cathode follower output. Depending upon the state of multivibrator 214, a low negative voltage output of amplifier 222 connected through lead 128 will be applied to the lower portion of the pulse gate of the binary counter effective to open the lower pulse gates and close the upper portion of the pulse gates or vice versa, thus directing the counter to count in the proper direction. When the error voltage on lead 180 is made negative, that is, the voltage on summing bus 158 is less negative than the input voltage on lead 160, a positive pulse is generated when the chopper contacts close. The negative pulse applied to grid 186 of tube 190 results in a signal which passes through diode crystal 194, amplifier 226, coincidence circuit 218 and capacitor 228 in sequence to the upper plate of multivibrator 214. When multivibrator 214 changes position, the counting direction of the binary counter is reversed.

The two triodes of tube 198 are provided with a potentiometer 230 to regulate the grid bias. The setting of potentiometer 230 determines the minimum positive pulse output from the triode sections of tube 190 which will be effective to trigger a negative pulse through lead 100 and capacitors 120 and 122 to the input of multivibrator 102. This threshold adjustment of the bias voltage is necessary since the counter would tend to hunt if the sensitivity of the counter pulse input circuit were such that a pulse would be generated when the difference between the digit voltages on lead 158 and the input voltage on lead 160 is less than the smallest voltage unit produced by the ratio networks. In other words, the counter would count back and forth swinging the error voltage on either side of the zero error voltage trying to find a point where the error voltage is equal to zero. Since it is impossible to change the voltage less than a full step at a time, no such point exists. In practice, potentiometer 230 is adjusted so that an error voltage of slightly greater than the smallest voltage step produced by the ratio networks must be present before pulses are sent to multivibrator 102.

The pulse code to be transmitted may be generated by using well known means for sampling the condition of the multivibrators in the binary counter and generating a sequence of pulses corresponding thereto. A sampling gate is connected to the plate of each of multivibrators 102, 104, 106 and 108. A pulse output lead is connected in common to each of the sampling gates. An electronic commutator is utilized to generate a series of timed pulses which are applied individually to each of the sampling gates in sequence. Depending on the condition of each multivibrator, a code pulse or a code blank is transmitted from each gate through the output lead. The aggregate of these output pulses in any one scan comprises a binary pulse code which corresponds to the position of the switches during the scanning period. Multiplexing and synchronization may also be performed by conventional means. Circuitry for the multiplexing and synchronization may utilize phantastron dividers or other known expedients to form pulses into their proper sequence and to cause the decoder to carry out the reverse of functions performed in the coder.

Obviously many modifications and variations of the present invention are possible in the light of the above teachings. It is therefore to be understood that within the scope of the appended claims the invention may be practiced otherwise than as specifically described.

What is claimed is:

1. In an analogue to digital coding system, a pulse counter, a plurality of switches having open and closed positions and controlled by said counter, a source of D. C. supply voltage, a plurality of ratio resistance networks having predetermined resistance ratios and equal in number to the number of switches controlled by said counter, means for connecting each of said ratio resistance networks through an associated switch of said plurality of switches to said supply voltage source, means for summing the output voltages of said ratio resistance networks, a source of input signal voltage, error voltage generating means for comparing the sum of said output voltages with the voltage on said source of input signal voltage and to generate an error voltage having an amplitude and sign depending upon the relative difference between said input and output voltages, said error voltage generating means including a chopper effective to periodically clamp said error voltage to a point of constant potential and thereby develop an output wave of alternating polarity, counter control means actuated by said error voltage for directing said counter to count in a direction tending to reduce said error voltage to zero, said counter control means including at least one coincidence circuit effective to pass only those portions of the output wave developed by said chopper which extend in one particular direction of polarity, and means for sampling said switches to produce a pulse code corresponding to the position of said switches.

2. The invention defined in claim 1 comprising in addition a limiter circuit for maintaining a threshold bias voltage on said counter control means so that the latter is inoperative unless said error voltage is above a predetermined level.

References Cited in the file of this patent

UNITED STATES PATENTS

| | | |
|---|---|---|
| 2,538,615 | Carbrey | Jan. 16, 1951 |
| 2,539,623 | Heising | Jan. 30, 1951 |
| 2,715,678 | Barney | Aug. 16, 1955 |
| 2,717,994 | Dickson et al. | Sept. 13, 1955 |
| 2,731,631 | Spaulding | Jan. 17, 1956 |
| 2,754,503 | Forbes | July 10, 1956 |